March 13, 1934.  F. P. MILLER ET AL  1,951,100
INSERTED BLADE CUTTER
Filed Sept. 28, 1931  3 Sheets-Sheet 1
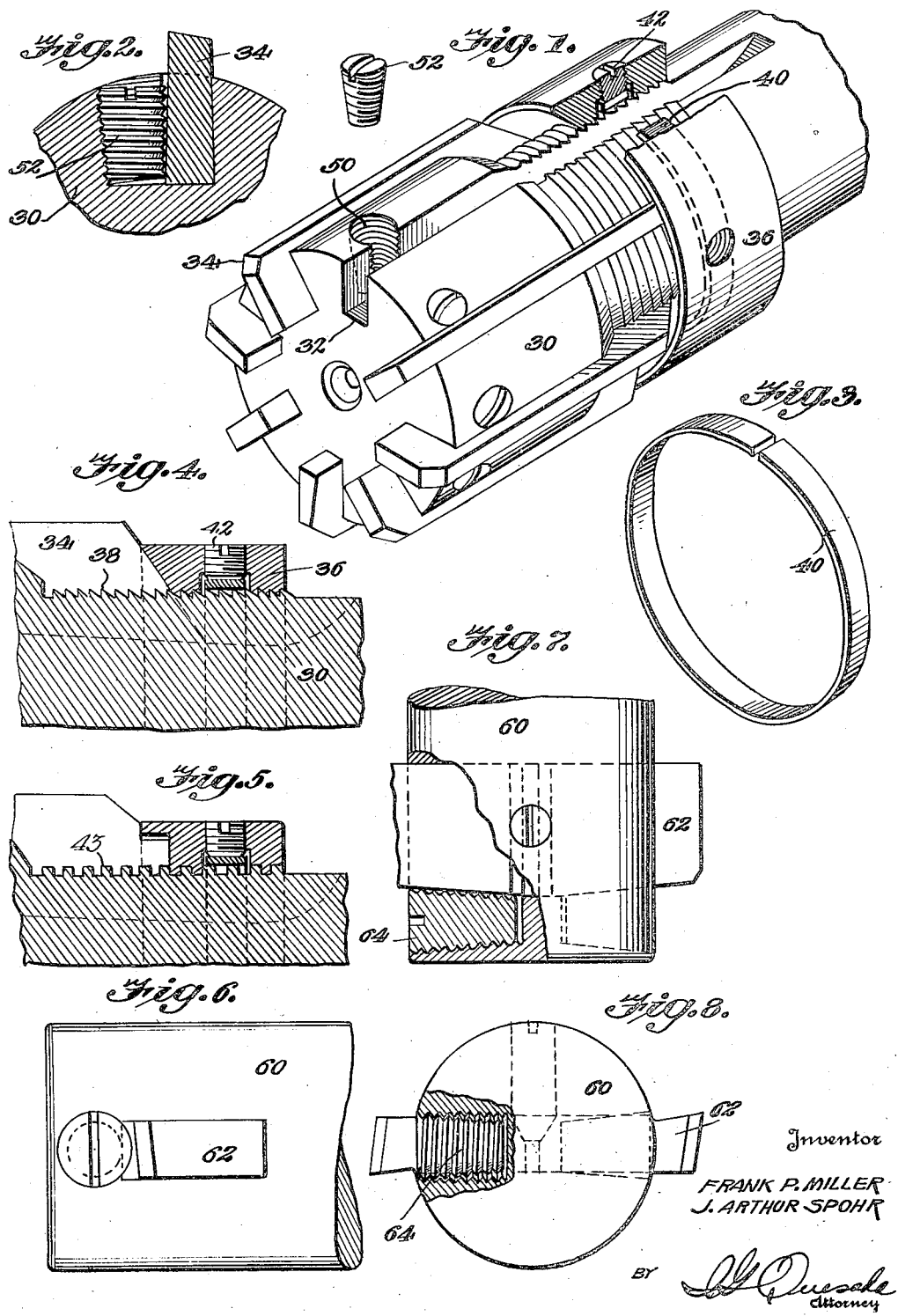
Inventor
FRANK P. MILLER
J. ARTHUR SPOHR
BY
Attorney

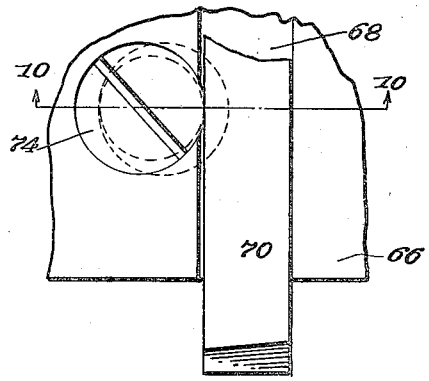
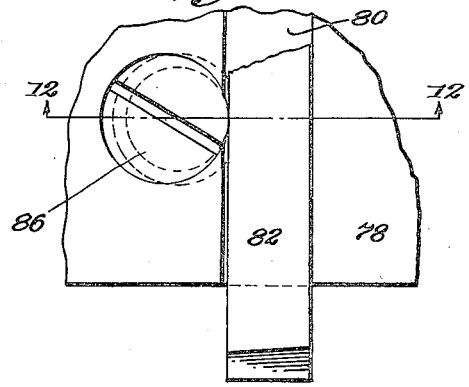
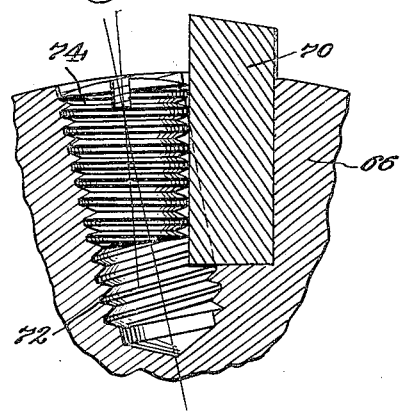
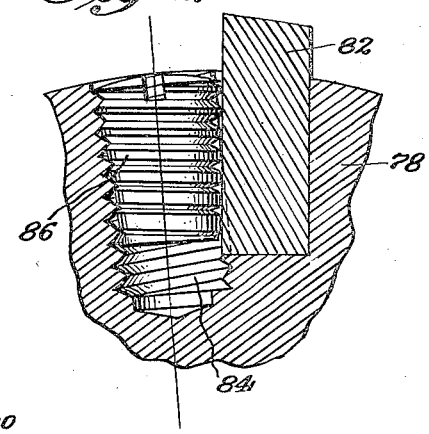
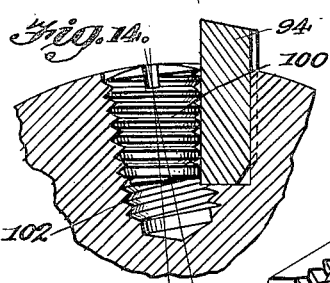
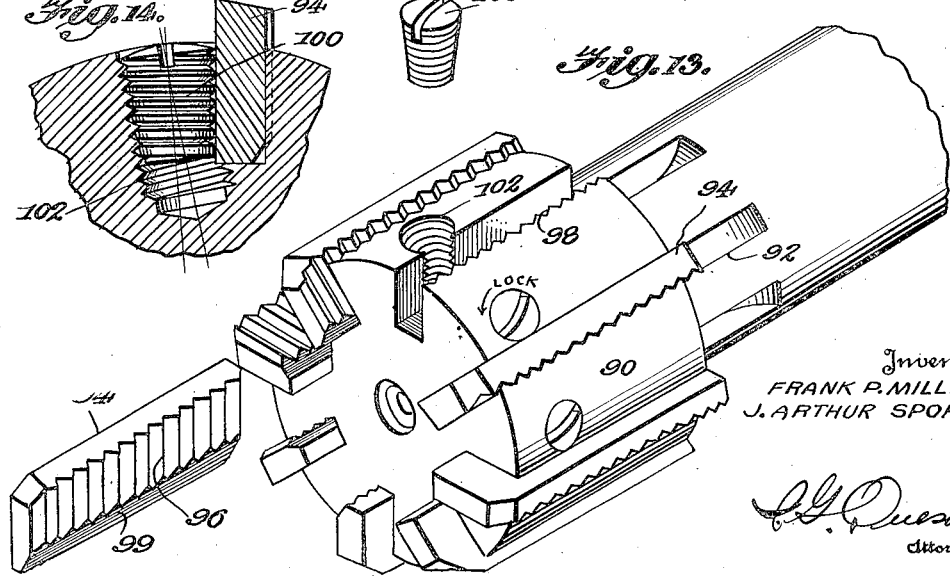

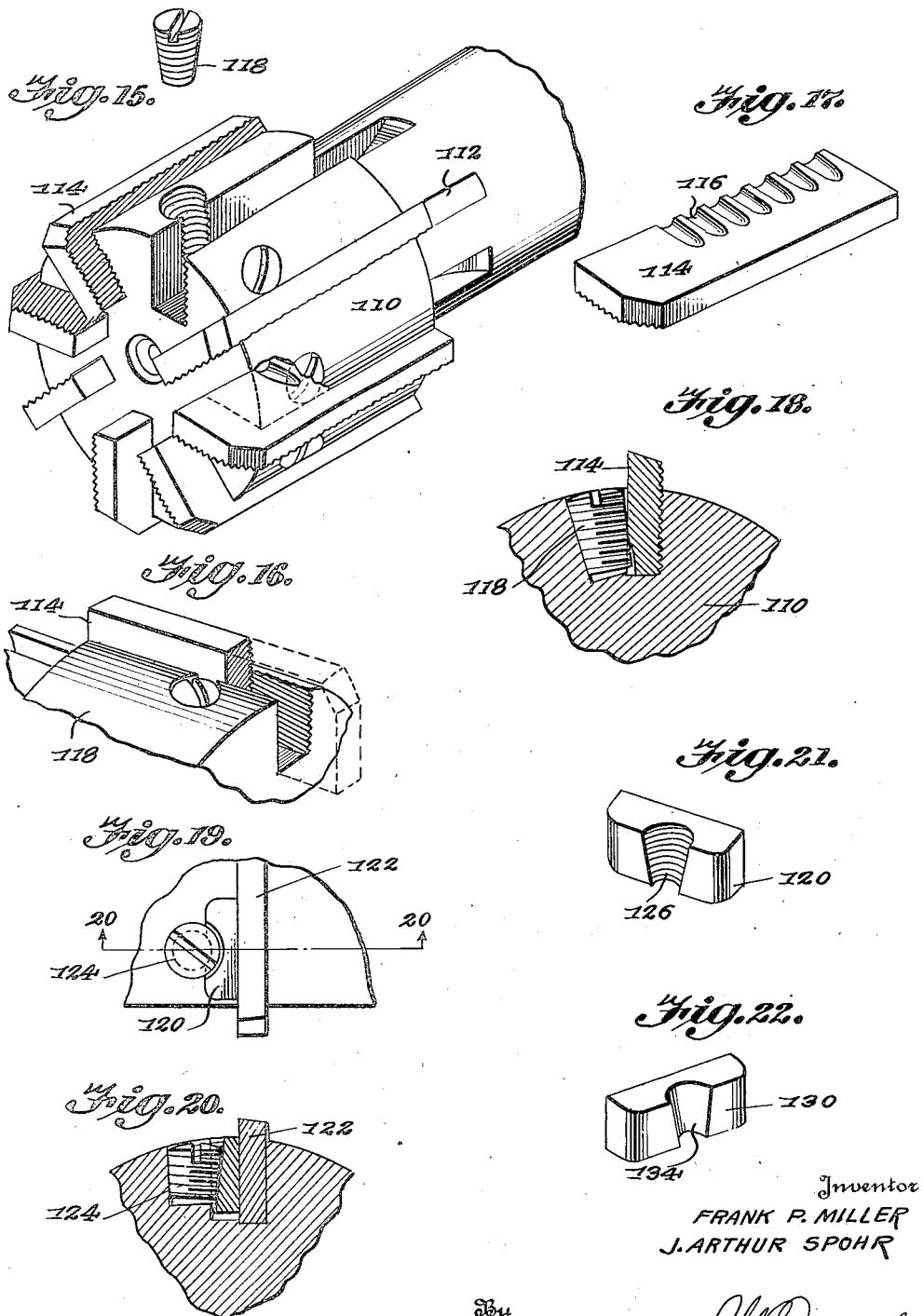

Patented Mar. 13, 1934

1,951,100

UNITED STATES PATENT OFFICE

1,951,100

INSERTED BLADE CUTTER

Frank P. Miller and John Arthur Spohr, Meadville, Pa., assignors to McCrosky Tool Corporation, Meadville, Pa., a corporation of Pennsylvania Application September 28, 1931, Serial No. 565,596

8 Claims. (Cl. 77—75)

This invention relates to cutting tools of the type in which the blades thereof are inserted and are adjustable to provide variable cutting diameters and to compensate for wear.

One of the principal features of the invention has reference to the means by which the blades of an inserted blade cutter may be securely held in an adjusted position and by way of brief explanation, it is pointed out that a tapered locking screw is mounted in operative relation to each blade with the axis of the screw intersecting the plane of the blade so that advancement of the screw will exert an effective binding force on the blade.

The invention will also be found to provide a cutter of the type described, which is of simple and rugged construction, capable of simple adjustment and relatively cheap to manufacture.

Other objects and advantages will be apparent during the course of the following description.

In the accompanying drawings, forming a part of this application and in which like numerals are employed to designate like parts throughout the same, Figure 1 is a fragmentary perspective partly in section of a reamer embodying the invention, one of the blades thereof being removed and one of the locking screws being shown in position for application, Figure 2 is a detail transverse sectional view illustrating the means by which the blades are held in an adjusted position, Figure 3 is a perspective of a pressure transmitting annulus embodied in the invention, Figure 4 is a detail longitudinal sectional view through the threaded portion of the reamer body and the associated adjusting collar, Figure 5 is a view similar to Figure 4, illustrating a slight modification of the invention, Figure 6 is a fragmentary side elevation of a boring bar embodying the invention, Figure 7 is a fragmentary side elevation of a boring bar, parts being in section and the view being taken at right angles to Figure 6, Figure 8 is an end elevation of the boring bar, parts being broken away, Figure 9 is a fragmentary plan view illustrating a further modification of the invention, Figure 10 is a transverse sectional view taken on line 10—10 of Figure 9, Figure 11 is a fragmentary plan view illustrating another expression of the invention, Figure 12 is a detail transverse sectional view taken on line 12—12 of Figure 11, Figure 13 is a fragmentary group perspective illustrating a still further modification of the invention, Figure 14 is a detail transverse sectional view through the cutter shown in Figure 13, the view illustrating the means by which each blade is held firmly in place, Figure 15 is a fragmentary group perspective disclosing another form of rotary cutter, Figure 16 is a fragmentary group perspective of the cutter shown in Figure 15, a portion of the single blade illustrated being broken away, Figure 17 is a perspective of one of the blades shown in Figure 15, Figure 18 is a detail transverse sectional view through a rotary cutter equipped with the form of blade illustrated in Figure 15, Figure 19 is a fragmentary plan view illustrating another expression of the invention, Figure 20 is a transverse sectional view taken on line 20—20 of Figure 19, Figure 21 is a perspective of a wedge of the kind shown in Figures 19 and 20, Figure 22 is a perspective of a slightly modified form of wedge.

In the drawings, wherein for the purpose of illustration are shown several preferred embodiments of the invention, the numeral 30 designates a reamer body having an annular series of longitudinal slots 32 opening out through the periphery and forward end thereof for the reception of blades 34. The blades are individually locked in place by means to be described later and the beveled rear ends of the blades are engaged by the inwardly beveled forward end of an adjusting collar 36.

Referring now to Figure 4, it will be seen that the adjusting collar 36 and the adjacent portion of the body 30 are provided with interfitting threads 38 of the buttress type having opposed contact walls substantially at right angles to the axis of the reamer body so that even though the collar 36 is allowed a slight freedom of lateral movement or shifting as a result of the looseness of the collar on the cutter body, the adjusting collar will, nevertheless, remain truly at right angles to the axis of the reamer body.

With further reference to the mounting of the adjusting collar 36, it is pointed out that the same is provided in the inner wall thereof with an annular groove receiving a split annulus 40, the ends of which come rather close together. The annulus 40 functions as a pressure transmitting element between the locking screw 42 and the threads of the reamer body and of course, the annulus is of brass or other material softer than that of the material forming the body 30 so that the advancement of the locking screw 42 will secure the adjusting collar in place without mutilating the threads 38 of the body.

With further reference to the means by which the adjusting collar 36 is held truly at right angles to the blades of the cutter, even though the collar is loosely mounted on the threads of the cutter, attention is invited to Figure 5 in which it is illustrated that the threads on the body may be square as indicated at 43 and that the threads on the collar may be similarly formed so that the opposed contact walls of the interfitting threads will be at right angles to the axis of the body even though a limited lateral shifting of the collar takes place as a result of the looseness that is invariably present between the interfitting threads. Since the opposed contact walls or surfaces of the interfitting threads of the collar and the body are at right angles to the axis of the body, as shown in Figure 5, canting of the collar is prevented with the result that the blades and more particularly the cutting portions thereof are held in line.

Referring now to the means by which the blades are held individually in place, attention is invited to Figures 1 and 2, in which it is illustrated that the body 30 is provided with more or less radial sockets 50 opening out through the periphery thereof and breaking into the slots 32 for the full depth of the slots so that the tapered locking screws 52 received therein may have effective binding force with the associated blades. It is clearly illustrated in Figure 2 that the blades 34 are increased more or less uniformly in width toward the inner edges thereof and that the taper of the screws produces a dove-tail effect between the screws and the blades by which the blades are firmly held in place. The sockets 50 are tapered toward the inner ends thereof so that the advancement of the tapered screws 50 will force the blades laterally into uniform pressure contact with the thrust receiving back walls of the slots.

With special reference to Figure 2 it will be seen that each tapered screw 52 and the socket 50 therefor have a common axis disposed at an angle to the plane of the associated blade and the increased width of the tapered screw toward the rear end thereof causes the screw to have an effective uniform lateral binding force against the blade. The tapered set screw 52 is shown to be provided with a thread of a uniform depth throughout, the edge portions of the threads being located for engagement with the blades.

Figures 6, 7 and 8 illustrate the application of the inventive idea to a boring bar and in these figures, the numeral 60 designates a bar having a slot opening out through opposite sides thereof for the reception of diametrically opposite blades 62. In Figure 7 it is illustrated that the blades 62 are increased in width slightly toward the inner ends thereof and are engaged by tapered locking screws 64. The tapered locking screws 64 are located in threaded sockets breaking for the full length thereof into the transverse slot in the bar 60 and such sockets extend at right angles to the axis of the bar.

In the form of invention illustrated in Figures 9 and 10 the cutter body 66 of whatever nature it happens to be, is provided with one or more slots 68 having parallel side walls and receiving blades 70 also having parallel side walls.

It is clearly shown in Figure 10 that the front side wall of each slot 68 is provided with a socket 72 extending at an angle to the plane of the adjacent blade and receiving a tapered locking screw 74. The threaded socket 72 is straight as distinguished from a tapered socket and when the threads of the tapered screw and the socket are interlocked as shown in Figure 10, the screw is presented for firm binding force against the adjacent blade. In further adverting to the mounting of the tapered locking screw 74, it is pointed out that the axis of the same intersects or is disposed at an angle to the axis of the socket and at the same time the axis of the locking screw is at an angle to the plane of the associated blade causing the screw to have uniform pressure contact for the full length thereof with the blade.

In case the invention is carried out in connection with a rotary cutter, such for example, as a reamer having an adjusting or thrust receiving collar, the threads of the tapered locking screws 74 may be left hand so that turning of the screw in a direction to lock the blade in place will not only urge the blade downwardly and laterally but will at the same time, urge the blade rearward into firm pressure contact with the adjusting collar. The tapered locking screw 74 is shown in Figure 10 to have left-hand threads having a uniform depth throughout and having the blade contact portions thereof ground slightly and uniformly for the full length of the screw.

In the form of invention illustrated in Figures 12 and 11, the cutter body is designated by the numeral 78 and is provided with one or more slots 80 receiving the blades 82, the sidewalls of the blades and the slots being parallel.

As shown in Figure 12, a socket 84 is provided at the front side of each slot 80 and breaks into the slot for the full depth of the slot so that the tapered locking screw 86 threaded into the socket may have effective lateral binding force against the blade. In Figure 12, like in Figure 10, the threaded socket 84 is straight as distinguished from a tapered one and has the axis thereof at an angle to the plane of the associated blade so that advancement of the screw 86 brings about uniform pressure contact of the tapered screw with the blade, thereby urging the blade inwardly and laterally. If the threads are left hand as shown in Figure 12, the blade will be urged rearward also.

In the form of screw shown in Figure 12, the same may be originally straight or of more or less uniform diameter and the taper is brought about by a grinding process taking away increased portions of the threads, as the threads approach the forward end of the screw.

Referring now to Figures 13 and 14 it will be seen that the rotary cutter shown therein has the head 90 thereof provided with an annular series of more or less uniformly spaced slots 92 opening out through the periphery and forward end thereof for the reception of blades 94. The back sides of the blades and the back or thrust receiving walls of the slots 92 are provided with transverse or approximately radial serrations 96 and 98 respectively, in the form of teeth adapted to be brought into closely interfitting relation to the end that the securing of the blades in a desired position is aided materially.

As shown in Figure 14, the teeth 98 or the grooves between these teeth have the major portions thereof of a uniform depth and the inner portions of the serrations or the grooves formed thereby decrease in depth at an angle to break into the inner portions of the slots 92 at points spaced slightly from the bottom walls of the slots. Otherwise expressed, the bottom walls of the serrations or the grooves defined between the serrations run parallel to the back walls of the slots from the periphery of the cutter to a point spaced slightly from the bottom walls of the slots and then turn sharply away and run into the slots. The purpose of this is to allow the chips formed by the serrating tool to clear themselves into the blade receiving slots. This avoids the necessity of a separate operation to provide a special groove for the clearance of the chips incident to the serrating operation. This arrangement not only avoids a separate operation but at the same time leaves much additional metal and a corresponding addition to the strength of the body of the tool. The back side of each blade has the inner portion thereof chamfered as indicated at 99 to clear the angularly extending bottom walls of the grooves defined between the teeth 98. The chamfer 99 is extended across the lower ends of the serrations 96.

With reference to Figure 14 it will be seen that each blade 94 is engaged by the tapered screw 100 threaded into an approximately radial tapered socket 102. The sockets 102 break for the full length thereof into the slots 94 so that the tapered screws may be in uniform binding engagement for the full length thereof with the associated blades and thereby bring about a firm interlocking connection between the serrations 96 and 98 and the secure retention of the blades in a set position.

The screw and socket arrangement shown in Figure 14 may be a composition of what is shown in Figures 10 and 11, the socket being straight with parallel side walls threaded for engagement by the screw 100. The screw 100 has the axis thereof disposed at an angle to the axis of the socket and at an angle to the plane of the blade, the threads of the screw being ground as in Figure 12, to produce the desired taper.

In the form of invention shown in Figures 15, 16, 17 and 18, the body of the cutter is designated by the numeral 110 and is provided with an annular series of slots 112 receiving blades 114. The back walls of the blades and the back or thrust receiving walls of the slots are provided with interfitting serrations extending at an acute angle to the axis of the tool so that endwise movement of the blades brings about a change in the cutting diameter of the tool.

The front side wall of each blade 114 is shown in Figure 17 to be provided with a plurality of more or less parallel spaced notches 116 gradually deepening in depth toward the inner end of the blade and adapted for the partial reception the tapered locking screw 118, the latter being threaded into a socket in the front side wall of the slot.

In the form of invention illustrated in Figures 19, 20 and 21, a wedge 120 may be mounted between each blade 122 and the associated tapered locking screw 124 and provides a means by which the binding force exerted by the screw is distributed over a wide area of the associated blade. Figure 21 illustrates that the wedge 120 is provided with a notch or depression extending from the outer to the inner edge of the wedge and being decreased in width or tapered toward the inner edge of the wedge and being provided with screw threads to match the screw threads of the socket which receives the locking screw 124 with the result that advancement of the set screw will bring about the exertion of a lateral binding force on the wedge. The screw receiving socket shown in Figures 19 and 20 may, like the other screw receiving sockets in the other cutters shown, be straight or as might be otherwise expressed, the various sockets for the reception of the blade locking screws may have parallel sides for threaded engagement by the tapered locking screws.

The modified form of wedge 130 shown in Figure 22 has the screw receiving notch or depression 134 thereof plain and not threaded, although it is shown to be decreased slightly in width or tapered toward the inner end thereof so that the advancement of the associated binding screw will urge the wedge inward as well as laterally, while, on the other hand, the presence of screw threads in the depression as shown in Figure 21 will result in a mere lateral movement of the wedge and only a negligible, if any, inward movement of the wedge.

The invention forming the subject of this application is capable of advantageous use in connection with a number of cutting tools in addition to the reamers and boring bar shown herein. For example, the invention may be incorporated in counter-bores, spot facers, hollow mills and milling cutters. In this connection, it is noted that the several forms of invention herein disclosed illustrate that the invention is capable of a wide variety of mechanical expressions and therefore it is to be understood that the forms of invention herewith shown and described are to be taken merely as preferred examples of the same and that such minor changes in arrangement and construction of parts may be made as will remain within the spirit of the invention and the scope of what is claimed.

Having thus described the invention, what is claimed is:

1. In an inserted blade cutter, a body having a slot and a socket breaking into the slot at an acute angle thereto and having parallel sides, a blade in said slot, and a laterally movable tapered screw threaded into said socket and having lateral binding engagement with said blade.

2. In an inserted blade cutter, a body having a slot and a substantially cylindrical socket breaking into the slot at an acute angle thereto, a member in the slot, and a screw tapered for the major portion of its length and threaded into said substantially cylindrical socket and having lateral binding engagement with said member.

3. In an inserted blade cutter, a body having a slot and a socket breaking into the slot at an acute angle thereto, a blade in the slot, and a laterally movable tapered screw threaded into said socket and having lateral binding engagement with said blade, and having the longitudinal axis thereof at an acute angle to the longitudinal axis of said socket.

4. In an inserted blade cutter, a body having a slot and a socket breaking into the slot and having parallel sides, a blade in said slot, and a tapered screw threaded into said socket and having lateral binding engagement with said blade and having the longitudinal axis thereof at an acute angle to the longitudinal axis of said socket, said socket being in converging relation to said blade causing the screw to move laterally into binding engagement with the blade.

5. In an inserted blade cutter, a body having a slot and a socket breaking into the slot at an acute angle thereto, a blade in the slot, and a laterally movable tapered screw threaded into said socket and having lateral binding engagement with said blade, and having the longitudinal axis thereof at an acute angle to the longitudinal axis of said socket, the longitudinal axis of said screw also being at an acute angle to the adjacent side of the blade.

6. In an inserted blade cutter, a body having a slot and a socket breaking into the slot at an acute angle thereto, a blade in the slot, and a screw threaded into said socket and having lateral binding engagement for the major portion of the length thereof with said blade, said screw having the longitudinal axis thereof at an acute angle to the longitudinal axis of the screw receiving socket.

7. In an inserted blade cutter, a body having a slot and a socket breaking into the slot at an acute angle thereto, a blade in the slot, and a screw threaded into said socket and having lateral binding engagement for the major portion of the length thereof with said blade, said screw having the longitudinal axis thereof at an acute angle to the longitudinal axis of the screw receiving socket, and to the screw engaged surface of the blade.

8. In an inserted blade cutter, a body having a slot and a socket breaking into the slot at an acute angle thereto, a blade in the slot, and a screw threaded into said socket and having lateral binding engagement for the major portion of the length thereof with said blade, said screw having the longitudinal axis thereof at an acute angle to the longitudinal axis of the screw receiving socket, the threads of said screw being decreased in depth toward the forward end thereof to give the screw a tapered form.

FRANK P. MILLER.
J. ARTHUR SPOHR.